United States Patent
Kamble et al.

(10) Patent No.: US 10,103,998 B2
(45) Date of Patent: Oct. 16, 2018

(54) OVERLAY NETWORK PRIORITY INHERITANCE

(71) Applicant: International Business Machines Corporation, Armonk, NY (US)

(72) Inventors: Keshav G. Kamble, Fremont, CA (US); Uday S. Nagaraj, Santa Clara, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 15/176,368

(22) Filed: Jun. 8, 2016

(65) Prior Publication Data
US 2016/0285773 A1    Sep. 29, 2016

Related U.S. Application Data

(63) Continuation of application No. 13/866,752, filed on Apr. 19, 2013, now Pat. No. 9,391,906.

(51) Int. Cl.
*H04L 12/28* (2006.01)
*H04L 12/833* (2013.01)
(Continued)

(52) U.S. Cl.
CPC ...... *H04L 47/2458* (2013.01); *H04L 12/4633* (2013.01); *H04L 45/64* (2013.01); *H04L 69/22* (2013.01); *H04L 69/324* (2013.01)

(58) Field of Classification Search
CPC . H04L 47/2458; H04L 12/4633; H04L 45/64; H04L 69/22; H04L 69/324
(Continued)

(56) References Cited

U.S. PATENT DOCUMENTS 7,436,844 B2 * 10/2008 Wang ............... H04L 41/5003
370/412
7,535,856 B2 * 5/2009 Booth, III ........ H04L 12/4641
370/255
(Continued)

FOREIGN PATENT DOCUMENTS

EP    1871045 A1    12/2007
WO    2013022481 A1    2/2013

OTHER PUBLICATIONS

Office Action from Chinese Patent Application No. 201410156345.6, dated Feb. 4, 2017.
(Continued)

*Primary Examiner* — Man Phan
(74) *Attorney, Agent, or Firm* — Zilka-Kotab, P.C.

(57) ABSTRACT

In one embodiment, a system includes a processor and logic integrated with and/or executable by the processor. The logic is configured to cause the processor to receive an overlay-encapsulated packet comprising one or more underlay packets. The logic is also configured to cause the processor to decapsulate the one or more underlay packets from the overlay-encapsulated packet. Moreover, the logic is configured to cause the processor to derive a priority for each of the one or more underlay packets based on a priority of the overlay-encapsulated packet, a transport header of the overlay-encapsulated packet, or the priority and the transport header of the overlay-encapsulated packet. In addition, the logic is configured to cause the processor to set the priority of the one or more underlay packets.

18 Claims, 10 Drawing Sheets

(51) Int. Cl.
*H04L 12/46* (2006.01)
*H04L 12/715* (2013.01)
*H04L 29/06* (2006.01)
*H04L 29/08* (2006.01)

(58) Field of Classification Search
USPC ............ 370/229–235, 328–39; 709/204–229
See application file for complete search history.

(56) References Cited

U.S. PATENT DOCUMENTS

| | | | | |
|---|---|---|---|---|
| 7,751,410 | B2* | 7/2010 | Lee | H04L 12/66 370/395.53 |
| 7,843,967 | B2* | 11/2010 | Baruah | H04L 47/10 370/466 |
| 8,005,095 | B2* | 8/2011 | Emmendorfer | H04L 12/2859 370/395.21 |
| 8,223,642 | B2* | 7/2012 | Curry | H04L 47/10 370/235 |
| 8,233,489 | B2* | 7/2012 | Welin | H04L 29/12028 370/389 |
| 9,391,906 | B2 | 7/2016 | Kamble et al. | |
| 2008/0285592 | A1* | 11/2008 | Emmendorfer | H04L 12/2861 370/474 |
| 2010/0061385 | A1 | 3/2010 | Welin et al. | |
| 2012/0027024 | A1* | 2/2012 | Liang | H04L 12/4641 370/412 |
| 2012/0182997 | A1* | 7/2012 | Balus | H04L 45/66 370/395.53 |
| 2014/0198802 | A1* | 7/2014 | Weaver | H04L 12/2834 370/401 |
| 2014/0313892 | A1 | 10/2014 | Kamble et al. | |

OTHER PUBLICATIONS

Kamble et al., U.S. Appl. No. 13/866,752, filed Apr. 19, 2013.
Non-Final Office Action from U.S. Appl. No. 13/866,752, dated Nov. 17, 2015.
Templin et al.. "Internet Society Requests for Comment (RFCs)," IP.com, Mar. 1, 2011, pp. 1-75.
Bianchi et al., "QUASIMODO: Quality of Service-Aware Multicasting over DiffServ and Overlay Networks," IEEE Network, Jan./Feb. 2003, pp. 38-45.
Notice of Allowance from U.S. Appl. No. 13/866,752, dated Apr. 11, 2016.

* cited by examiner

OVERLAY NETWORK PRIORITY INHERITANCE

BACKGROUND

The present invention relates to data center infrastructure, and more particularly, this invention relates to providing priority information to packets during overlay network processing.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch (tunnel end point) strips off the overlay header encapsulation, UDP transport header, and IP header, and delivers the original packet to the destination end station via conventional network connections. In addition to this tunneling mechanism, the edge switches participate in an address discovery protocol, which may be learning/flooding based, or lookup-based.

Overlay networks, like Virtual eXtensible Local Area Network (VXLAN), Network Virtualization using Generic Routing Encapsulation (NVGRE), etc., connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels.

An overlay network may be implemented using a number of VMs with a virtualization platform controlling the processing of networking packets in and out of each VM and one or more VMs may be associated with the overlay network. A virtualization platform processes the networking traffic associated with each overlay network and/or VM using predefined properties and policies for the corresponding overlay network and/or VM. As the number of overlay networks increases, so does the processing load requirements of the virtualization platform.

A server may host any number of VMs, but the VMs do not always set packet priority bits in virtual local area network (VLAN) tags of the packets when the packets are tagged during egress processing. In addition, virtual switches (vSwitches) within a server do not always set packet priority bits in VLAN tags if the packets are tagged or double tagged during egress processing. This is because the VM or vSwitch may rely on an immediate switch to which the server is connected to provide the priority tagging in the VLAN tags. Tagging is only required, according to processing standards, when a packet is being classified or when the packet is being attributed to a particular group.

Underlay tunneling and packet handling modules for VXLAN or other overlay networks do not have visibility to any priority tagging of inner packets. This creates a problem for all further packet processing engines downstream which must handle the packet without knowing a priority of the packet. occasionally, high priority inner packets (e.g., inner Fiber Channel over Ethernet (FCoE) packets, inner video packets, etc.) may receive low priority processing due to underlay packet priority not matching the high priority inner packets. Hence, in some instances, these high priority packets may even be dropped due to ambiguity of the priority.

Accordingly, it would be beneficial to have a solution which accounts for a packet's priority even when processing an underlay packet having the packet encapsulated therein.

SUMMARY

In one embodiment, a system includes a processor and logic integrated with and/or executable by the processor. The logic is configured to cause the processor to receive an overlay-encapsulated packet comprising one or more underlay packets. The logic is also configured to cause the processor to decapsulate the one or more underlay packets from the overlay-encapsulated packet. Moreover, the logic is configured to cause the processor to derive a priority for each of the one or more underlay packets based on a priority of the overlay-encapsulated packet, a transport header of the overlay-encapsulated packet, or the priority and the transport header of the overlay-encapsulated packet. In addition, the logic is configured to cause the processor to set the priority of the one or more underlay packets.

In another embodiment, a method for determining priority of packets includes receiving an overlay-encapsulated packet comprising one or more underlay packets. The method also includes decapsulating the one or more underlay packets from the overlay-encapsulated packet. In addition, the method includes deriving a priority for each of the one or more underlay packets based on a priority of the overlay-encapsulated packet, a transport header of the overlay-encapsulated packet, or the priority and the transport header of the overlay-encapsulated packet. Moreover, the method includes setting the priority of the one or more underlay packets.

In yet another embodiment, a computer program product for determining priority of packets includes a computer readable storage medium having program instructions embodied therewith. The embodied program instructions are readable by a processor to cause the processor to receive an overlay-encapsulated packet having one or more underlay packets. The embodied program instructions are also readable to cause the processor to decapsulate the one or more underlay packets from the overlay-encapsulated packet. In addition, the embodied program instructions are readable to cause the processor to derive a priority for each of the one or more underlay packets based on a priority of the overlay-encapsulated packet, a transport header of the overlay-encapsulated packet, or the priority and the transport header of the overlay-encapsulated packet. Moreover, the embodied program instructions are readable to cause the processor to set the priority of the one or more underlay packets.

Other aspects and embodiments of the present invention will become apparent from the following detailed description, which, when taken in conjunction with the drawings, illustrate by way of example the principles of the invention.

DETAILED DESCRIPTION

Figure 1:
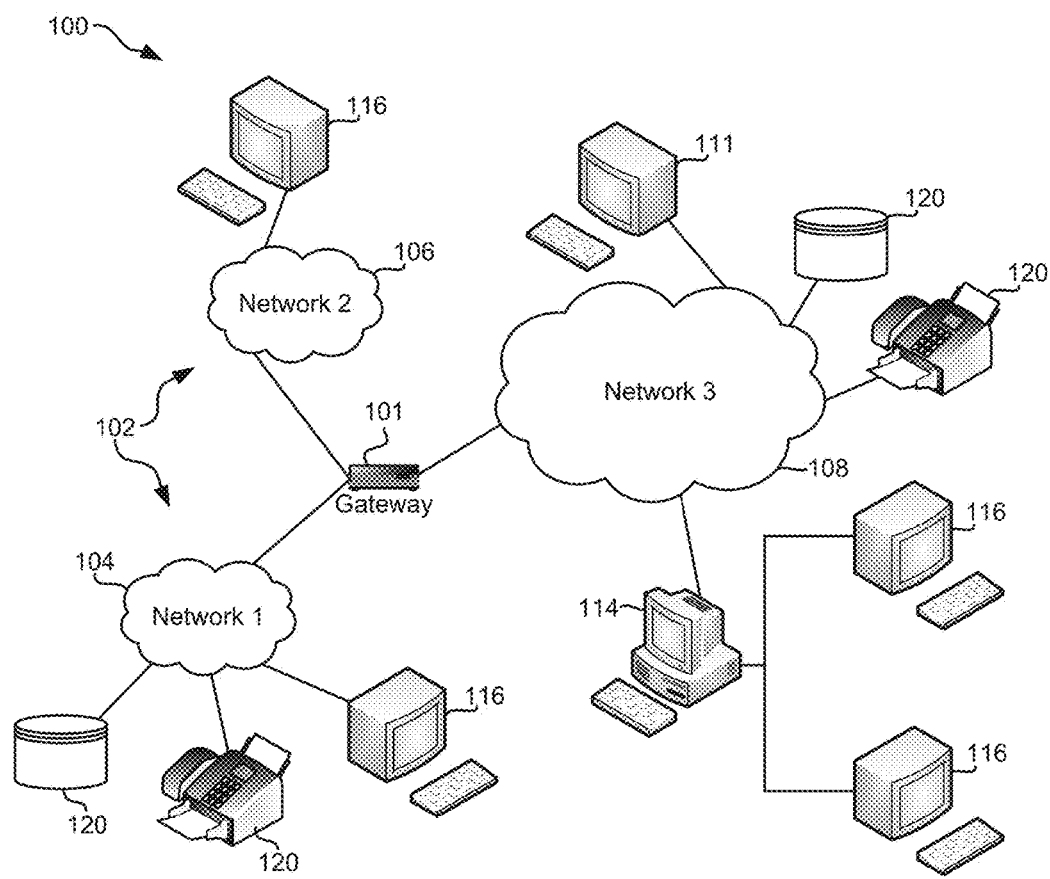
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to various embodiments, one or more underlay packets may inherit 802.1p priority bit values from an overlay packet encapsulating the underlay packet(s) upon decapsulation on the underlay packet(s). Furthermore, the underlay 802.1p bits and underlay internet protocol (IP) Differentiated Services Code Point (DSCP) values may be derived from the inherited 802.1p values. Also, a programmable table for deriving a value of the 802.1p and DSCP values may be provided for encapsulation processing, with the table being programmed in a virtualization platform of a server, an overlay-capable network interface card (NIC), an overlay network gateway, or some other overlay-capable device. On an ingress side, if an underlay packet's priority is not known, the packet's priority may be derived from an overlay packet encapsulating the underlay packet and used for internal processing of the underlay packet.

In one general embodiment, a system includes logic adapted for receiving an overlay-encapsulated packet including one or more underlay packets, logic adapted for decapsulating the one or more underlay packets from the overlay-encapsulated packet, logic adapted for deriving a priority for each of the one or more underlay packets based on at least one of: a priority of the overlay-encapsulated packet, a transport header of the overlay-encapsulated packet, and an application designation of the one or more underlay packets, and logic adapted for setting the priority of the one or more underlay packets.

In another general embodiment, a method for determining priority of packets includes receiving an overlay-encapsulated packet including one or more underlay packets, decapsulating the one or more underlay packets from the overlay-encapsulated packet, deriving a priority for each of the one or more underlay packets based on at least one of: a priority of the overlay-encapsulated packet, a transport header of the overlay-encapsulated packet, and an application designation of the one or more underlay packets, and setting the priority of the one or more underlay packets.

In yet another general embodiment, a computer program product for determining priority of packets including a computer readable storage medium having computer readable program code embodied therewith, the computer readable program code including computer readable program code configured for receiving an overlay-encapsulated packet including one or more underlay packets, computer readable program code configured for decapsulating the one or more underlay packets from the overlay-encapsulated packet, computer readable program code configured for deriving a priority for each of the one or more underlay packets based on at least one of: a priority of the overlay-encapsulated packet, a transport header of the overlay-encapsulated packet, and an application designation of the one or more underlay packets, and computer readable program code configured for setting the priority of the one or more underlay packets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
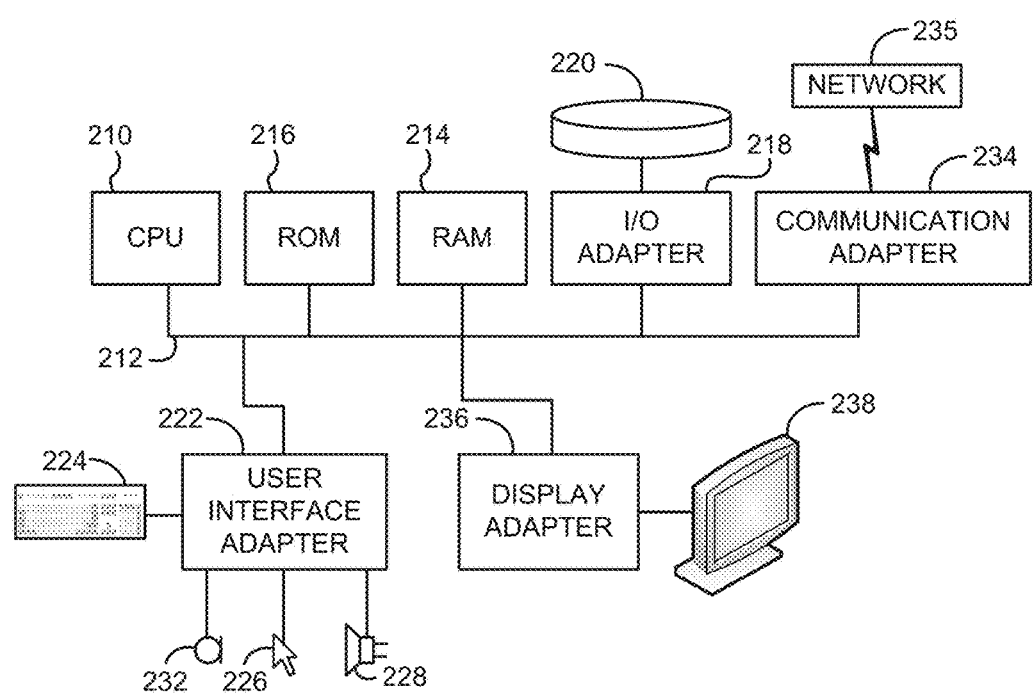
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
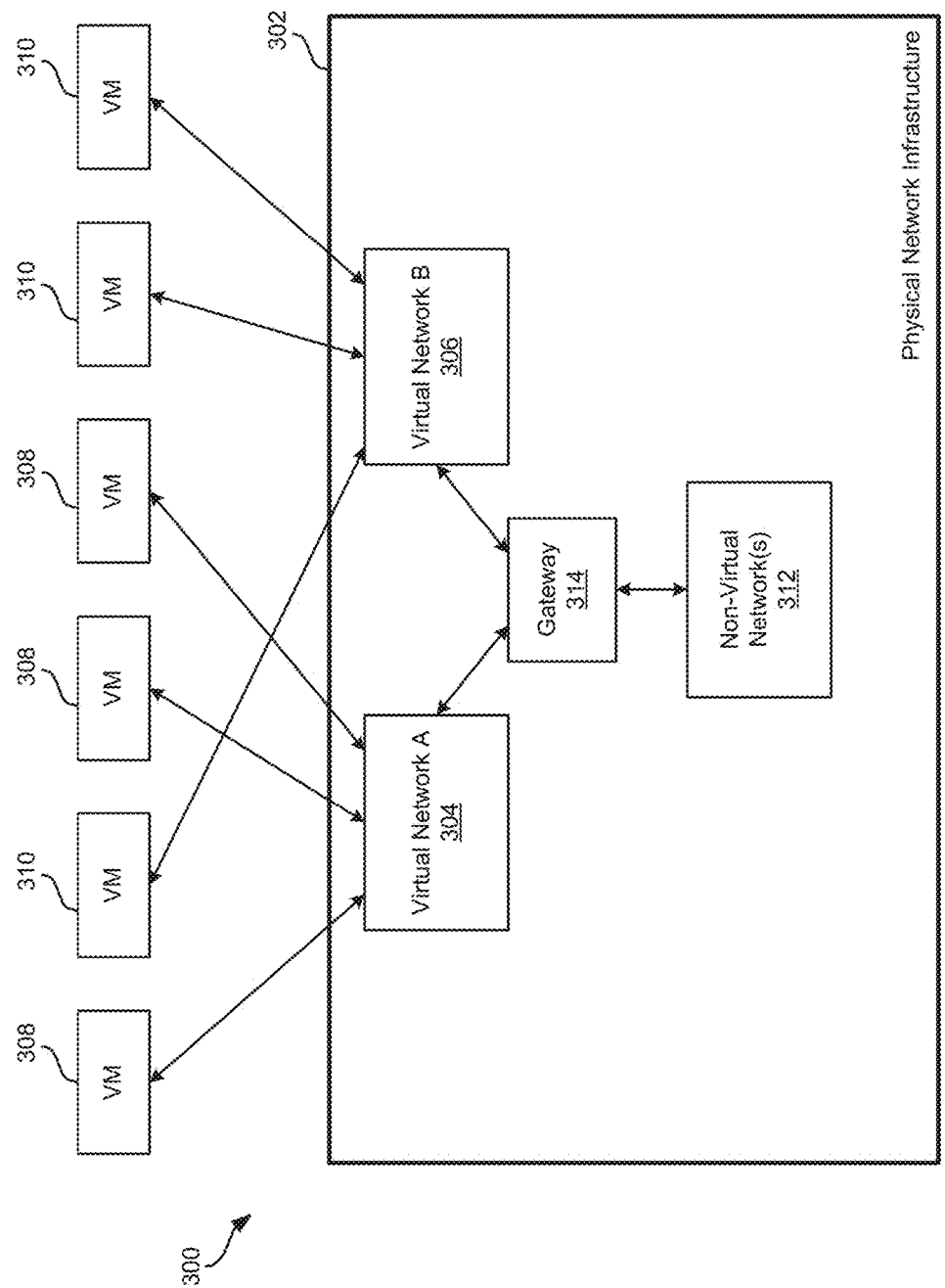
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the L2 packets into an overlay header also referred to as virtual tunnel end point (VTEP) management. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, virtualization platforms, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

Figure 4:
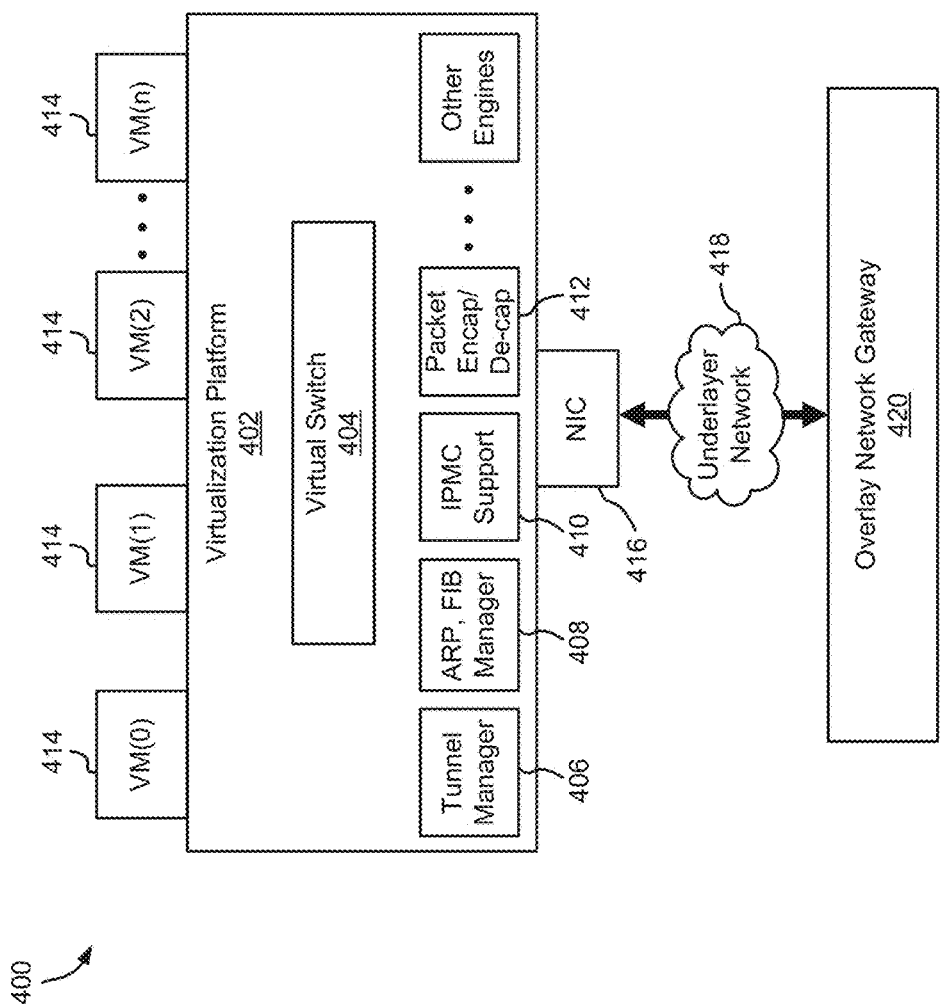
FIG. 4 shows an overlay-capable server connected to an underlay network, according to one embodiment.

With reference to FIG. 4, a server 400 is shown connected to an underlayer network 418. As shown, the server 400 includes a virtualization platform 402 which provides and manages a virtual switch 404. To provide overlay functionality to the server 400, the virtualization platform 402 also interacts with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. The virtualization platform 402 also provides support for any number of VMs 414, shown in FIG. 4A as VM 0, VM 1, VM 2, ..., VM n. The VMs 414 may be arranged in one or more virtual networks (each virtual network may have a different virtual network identifier (VNID), indicated as VNID 1, VNID 2, VNID 3, etc., in FIG. 4A). The number and arrangement of the VMs 414 in the exemplary virtual networks is not meant to be limiting on what configurations are possible, as the Figures only show exemplary arrangements of VMs 414 and virtual networks.

In addition, the server 400 includes a physical NIC 416 which manages and provides for communications between the underlayer network 418 and the server 400, in one approach. The NIC 416 includes one or more networking ports adapted for communicating with the underlayer network 418 and the server 400. When a packet is encapsulated in an overlay header by the packet encap/de-cap engine 412, the NIC 416 simply passes the packet through to a destination specified in an outer header of the overlay-encapsulated packet. According to one embodiment, In order to bridge between virtualized and non-virtualized networks, the packet may be delivered to an overlay network gateway 420, for further forwarding and/or routing outside of the virtual network in which the server 400 is located.

Figure 5:
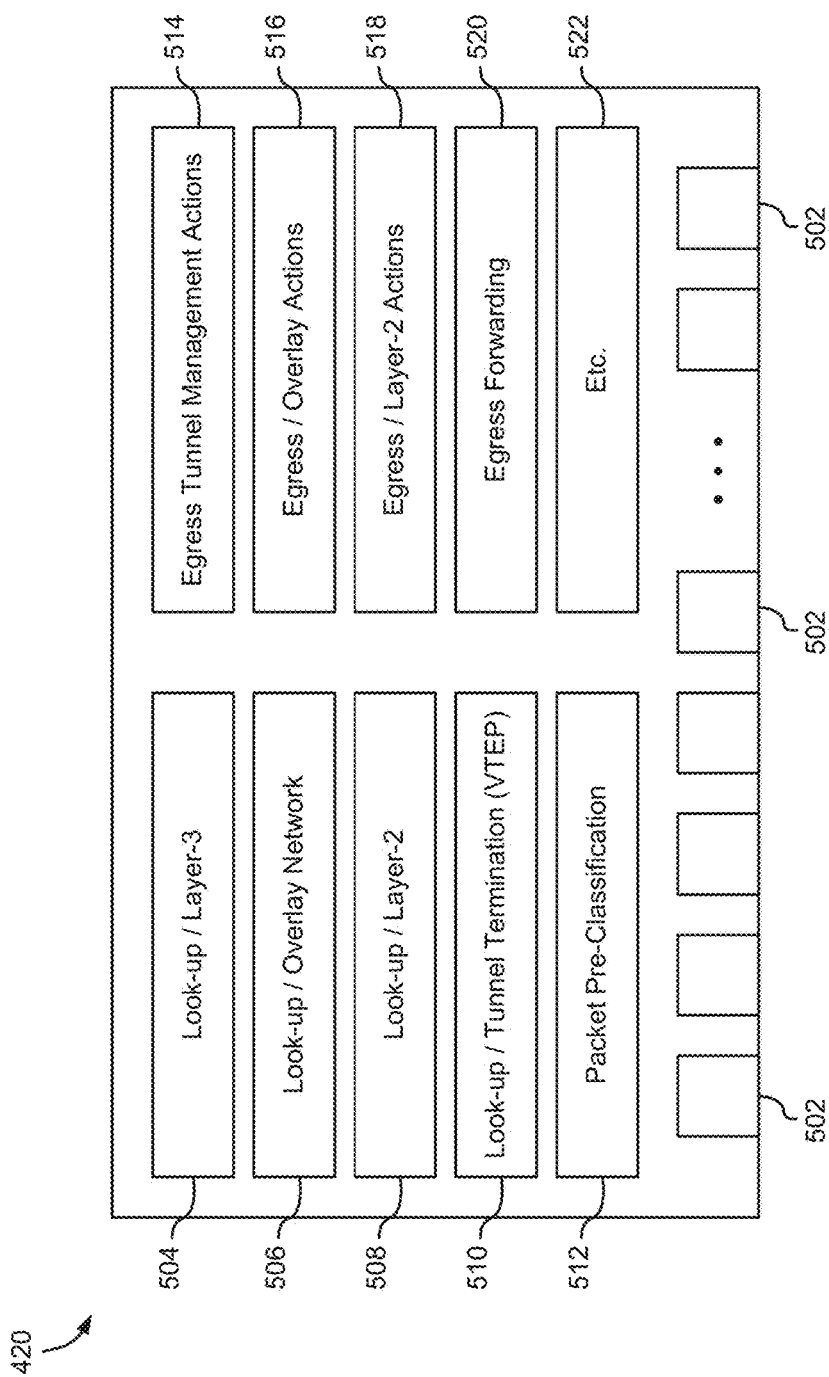
FIG. 5 shows a detailed view of an overlay network gateway, according to one embodiment.

Referring now to FIG. 5, a detailed view of an overlay network gateway 420 is shown according to one approach. The overlay network gateway 420 comprises a plurality of ports 502 which may be used for packet ingress and/or packet egress. Any number of ports 502 may be present, depending on the arrangement and capabilities of the overlay network gateway 420, such as 16 ports, 32, ports, 64 ports, 128 ports, etc. The overlay network gateway 420 also comprises logic adapted for performing look-ups for L3 addresses and devices 504, logic adapted for performing look-ups for overlay addresses and devices 506, logic adapted for performing look-ups for L2 addresses and devices 508, logic adapted for performing look-ups for tunnel addresses and devices 510, logic adapted for performing packet pre-classification 512, logic adapted for performing egress tunnel management actions (VTEP) 514, logic adapted for performing egress overlay actions 516, logic adapted for performing egress L2 actions 518, logic adapted for performing egress forwarding actions 520, along with possibly other packet functionality 522. Any or all of this logic may be implemented in hardware or software, or a combination thereof. For example, separate modules for each distinct logic block may be implemented in one or more processors, in one embodiment. The processor(s) may include, but are not limited to, an application specific integrated circuit (ASIC), a field programmable gate array (FPGA), a central processing unit (CPU), a microcontroller (MC), a microprocessor, or some other processor known in the art.

In one embodiment, priority of incoming packets may be mapped at ingress based on rules or based on the priority of the inner packet. The outer and inner packet processing may be based on the priority mapping created at ingress. Furthermore, egress 802.1p priority may be maintained as per ingress priority mapping.

In order to increase performance of a virtual networking server using a virtualization platform, overlay network traffic processing may be provided by utilizing a NIC having overlay gateway functionality. Specifically, the NIC having overlay gateway functionality may be adapted for providing some or all functionality of an overlay network gateway, such as managing virtual tunnel end points (VTEPs), address resolution protocol (ARP) cache handling, ARP learning, packet encapsulation and de-capsulation for each overlay network, various look-up functionality for L2, L3, and/or overlay networks, egress packet processing and forwarding, etc. This overlay network gateway functionality may be processed exclusively via the NIC or in combination with other overlay devices, possibly using separate modules and/or processors, and the processed traffic may be delivered to the virtualization platform for final delivery to the appropriate VM(s) or the traffic may be sent down to the network for delivery to a destination VTEP or another IP-based address.

Figure 6:
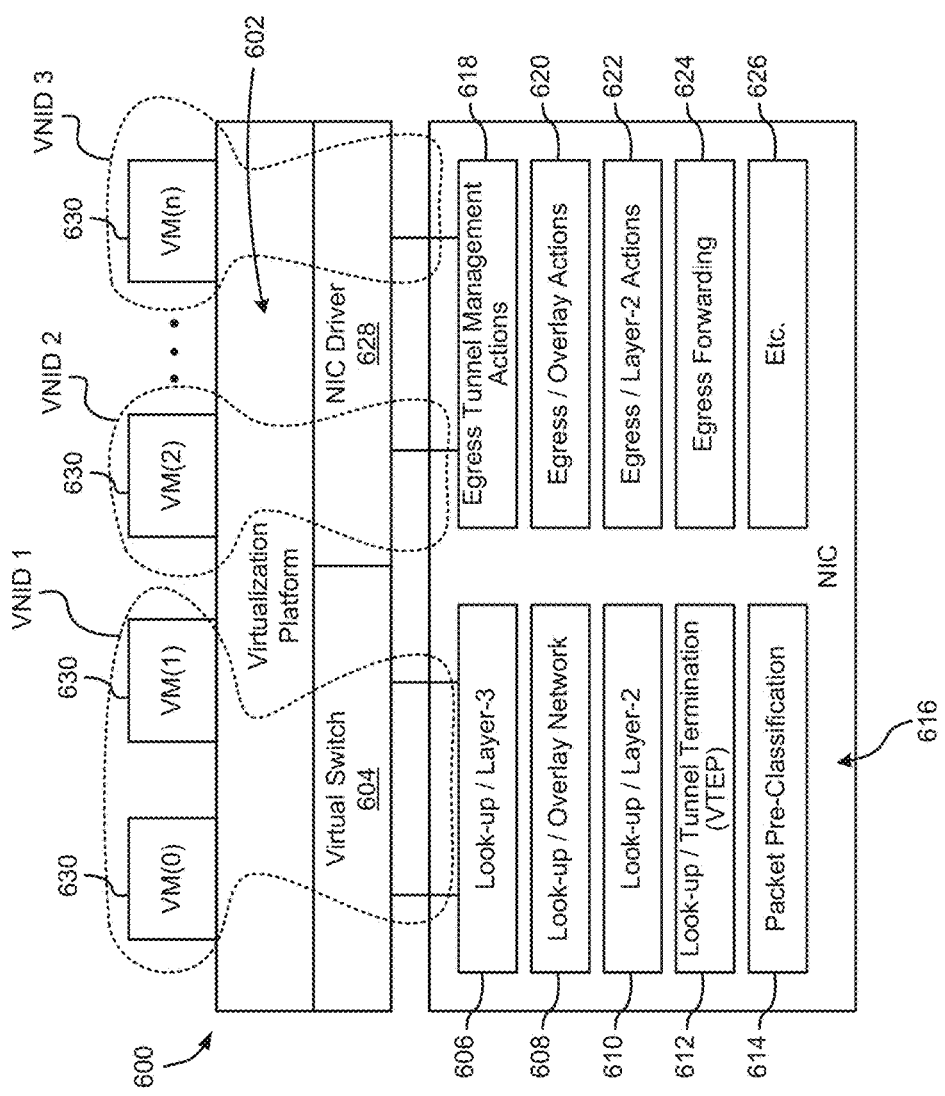
FIG. 6 shows an overlay-capable server using a network interface card (NIC) having overlay gateway functionality, according to one embodiment.

Now referring to FIG. 6, a server 600 using a NIC 616 having overlay network gateway functionality is shown according to another approach. The server 600 also comprises a virtualization platform 602 which provides and manages a virtual switch 604. The virtualization platform 602 also provides support for any number of virtual machines (VMs) 630, shown in FIG. 6 as VM 0, VM 1, VM 2, . . . , VM n. The VMs 630 may be arranged in one or more virtual networks (each virtual network may have a different virtual network identifier (VNID), indicated as VNID 1, VNID 2, VNID 3, etc., in FIG. 6). The number and arrangement of the VMs 630 in the exemplary virtual networks is not meant to be limiting on what configurations are possible, as the Figures only show exemplary arrangements of VMs 630 and virtual networks.

The NIC 616 makes use of one or more processors in order to provide overlay network gateway functionality, such that all overlay network gateway functionality may be offloaded onto the NIC 616, in one embodiment. This overlay network gateway functionality may be embedded as modules within the NIC 616, and may include, but is not limited to, performing look-ups for L3 addresses and devices 606, performing look-ups for overlay addresses and devices 608, performing look-ups for L2 addresses and devices 610, performing look-ups for tunnel addresses and devices 612, performing packet pre-classification 614, performing egress tunnel management actions (VTEP) 618, performing egress overlay actions 620, performing egress L2 actions 622, performing egress forwarding actions 624, along with possibly other packet functionality 626, as well as any other overlay network gateway functionality known in the art.

According to some embodiments, the egress tunnel management actions module 618 may be adapted for providing VTEP origination and termination operations, the various look-up modules 606, 608, 610, and 612 may be adapted for providing look-up operations for packets having an unknown address and forwarding information for packets having a known address, the various egress modules 618, 620, 622, and 624 may be adapted for handling the forwarding and/or sending operations for packets.

In order to provide an interface between the NIC 616 and the virtualization platform 602 in the server 600, a NIC driver 628 may be provided in the server 600 which understands and supports the overlay network gateway functionality that has been provided by the NIC 616, and may manage the NIC 616 accordingly.

In this way, according to one embodiment, in order to adapt a server 600 for use with a different overlay protocol, a NIC driver 628 capable of interfacing with the overlay network protocol supported by an installed NIC 616 having overlay network gateway functionality may be implemented in the server 600. In one non-limiting example, if a server is capable of VXLAN overlay functionality, and this server is to be used in an environment using Microsoft's Hyper-V, an accelerated NIC capable of Hyper-V may be installed in the server, and a NIC driver supporting Hyper-V may be implemented in the server, thereby rendering the server capable of operating in an overlay environment which utilizes Hyper-V as the overlay protocol. One of skill in the art would recognize that this procedure may be used regardless of the overlay protocol.

In one embodiment, if the server 600 already has a NIC driver 628 installed that is capable of supporting a certain overlay protocol, and a NIC 616 having overlay network gateway functionality capable of providing the certain overlay protocol is installed in the server 600, then the NIC 616 may simply be inserted into an available PCIe slot of the server 600, and may operate once installed, in a plug-and-play type arrangement.

In one embodiment, priority of incoming packets may be mapped at ingress based on rules or based on the priority of the inner packet. The outer and inner packet processing may be based on the priority mapping created at ingress. Furthermore, egress 802.1p priority may be maintained as per ingress priority mapping.

Figure 7:
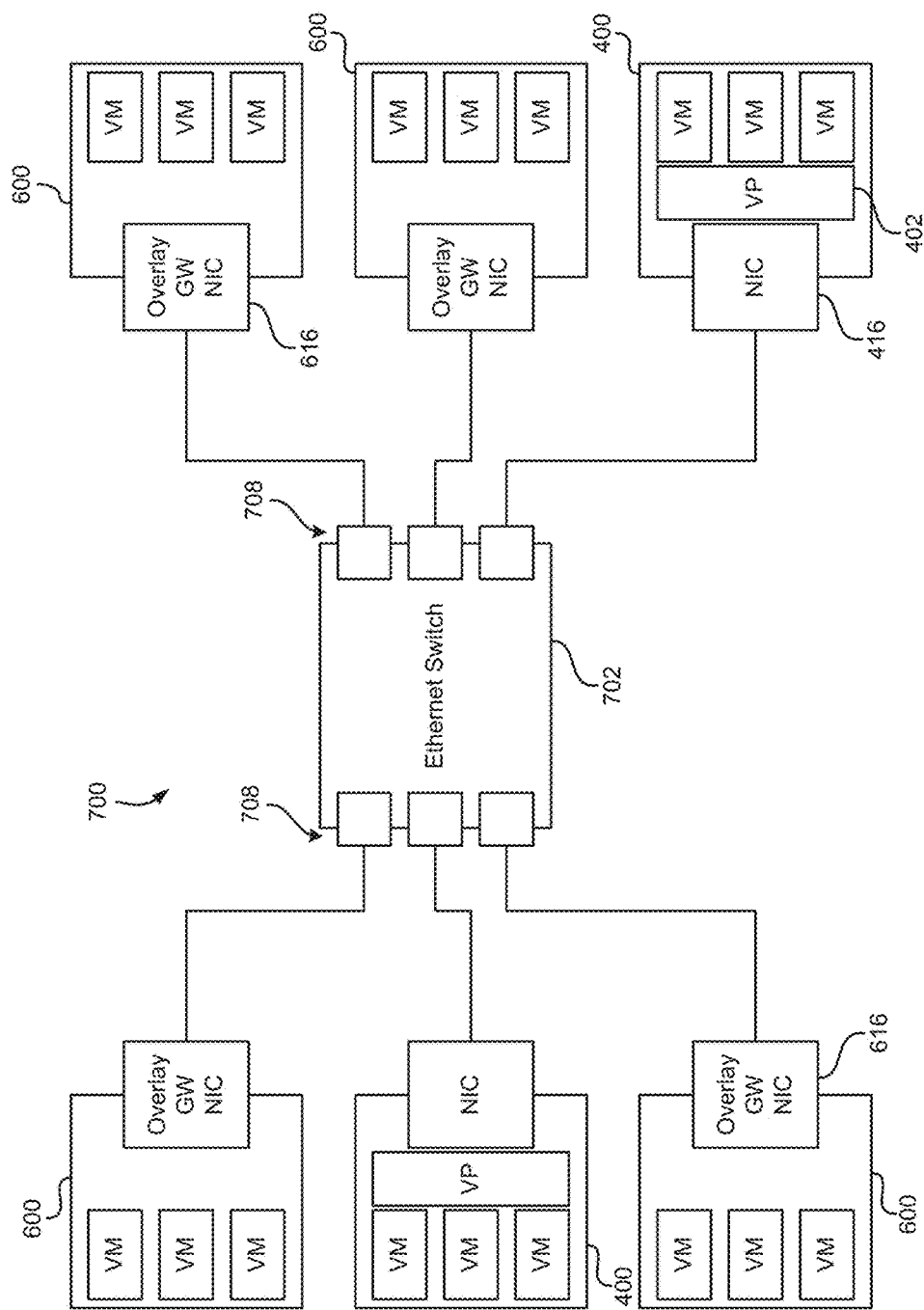
FIG. 7 shows a network including various servers with NICs, according to one embodiment.

As shown in FIG. 7, a network 700 is shown according to one embodiment. As shown, servers 400 having contemporary NICs 416 and servers 600 having overlay gateway (GW) NICs 616 may be used in the same network 700. One or more Ethernet switches 702 may be used to interconnect the servers 400, 600 or the servers 400, 600 may be connected directly to one another. Each Ethernet switch 702 includes a plurality of ports 708 for connecting thereto. The contemporary NICs 416 may include a virtualization platform (VP) 402 that may provide some overlay functionality.

According to one embodiment, any component shown in the network 700 may include functionality for determining a priority of packets. In one such embodiment, a system (such as a server 400, 600, an Ethernet switch 702, an overlay GW NIC 616, a virtualization platform 402, etc.) may comprise logic adapted for receiving an overlay-encapsulated packet comprising one or more underlay packets, logic adapted for decapsulating the one or more underlay packets from the overlay-encapsulated packet, logic adapted for deriving a priority for each of the one or more underlay packets based on information included in the overlay-encapsulated packet, and logic adapted for setting the priority of the one or more underlay packets. The information used to derive priority may be a priority of the overlay-encapsulated packet, determined from a transport header of the overlay-encapsulated packet and/or an application designation of the one or more underlay packets, or based on any other information related to the overlay-encapsulated packet.

In one approach, the logic adapted for setting the priority for each of the one or more underlay packets may include logic adapted for setting each underlay layer-2 packet's 802.1p bits to designate the derived priority. In this way, any device which relies on the underlay packet's 802.1p bits will be able to determine the priority of the underlay packet(s). Furthermore, the priority of the overlay-encapsulated packet may be designated via the overlay-encapsulated packet's 802.1p bits, and in this approach, the priority for each of the one or more underlay packets may be derived from the overlay-encapsulated packet's 802.1p bits.

In another approach, the logic adapted for setting the priority for each of the one or more underlay packets may comprise logic adapted for setting each underlay layer-3 packet's DSCP value to designate a particular quality of service (QoS), as is understood in the art. The priority of the overlay-encapsulated packet may be designated via the overlay-encapsulated packet's DSCP value, and in this approach, the priority for each of the one or more underlay packets may be derived from at least the overlay-encapsulated packet's DSCP value, and possibly from other information sources, such as the overlay-encapsulated packet's 802.1p bits.

In one embodiment, logic adapted for egress processing the one or more underlay packets may be included in a traffic manager. The egress processing may be based on the derived priority or a DSCP mapping. Furthermore, the logic adapted for setting the priority for each of the one or more underlay packets may comprise logic adapted for setting each underlay layer-2 packet's 802.1q tag to designate the derived priority when the one or more underlay packets are egress processed by the traffic manager.

In a further approach, logic adapted for ingress processing the one or more underlay packets using the traffic manager may be included in the system, with the ingress processing being based on the derived priority or the DSCP mapping.

In one approach, a DSCP or 802.1p priority may be determined based on a mapping table, as shown in Table 1. In this approach, access control lists (ACLs) may be used to dictate processing once a certain criteria has been met. This mapping table correlates an ACL to specific 802.1p bits, and to specific DSCP value mapping, such that the 802.1p bits may be correlated to DSCP values. In this exemplary table, ACL 1, ACL 2, and ACL 3 are different ACLs which may cause different actions to be performed in response to the ACL being enacted. Also, the 802.1p priority mapping bits listed are for example only, and any of the 0-7 available priority bits (0x1, 0x2, . . . , 0x7) may be assigned according to any desired mapping. Furthermore, Mapping_1, Mapping_2, and Mapping_3 are different DSCP mappings which cause different DSCP values to be inserted into a packet depending on the ACL applied or 802.1p priority bits.

TABLE 1

| Rule | 802.1p Priority Mapping | DSCP Value Mapping |
| --- | --- | --- |
| ACL 1 | 0 × 7 | Mapping_1 |
| ACL 2 | 0 × 3 | Mapping_2 |
| ACL 3 | 0 × 4 | Mapping_3 |
| . . . | . . . | . . . |
| ACL n | 0 × 1 | Mapping_n |

The ACL rule tuples may include any relevant information, such as an underlay packet's source MAC (SMAC) address, destination MAC (DMAC) address, Ethertype, VLAN identifier (ID), priority, source IP (SIP) address, destination IP (DIP) address, protocol used, source port (SPORT), destination port (DPORT), etc. The ACL tuples may further be based on an overlay-encapsulated packet's SMAC address, DMAC address, Ethertype, VLAN ID, priority, SIP address, DIP address, protocol used, SPORT, DPORT, etc. In more approaches, the ACL tuples may be based on a UDP SPORT, a UDP DPORT, a VNID, etc.

Figure 8:
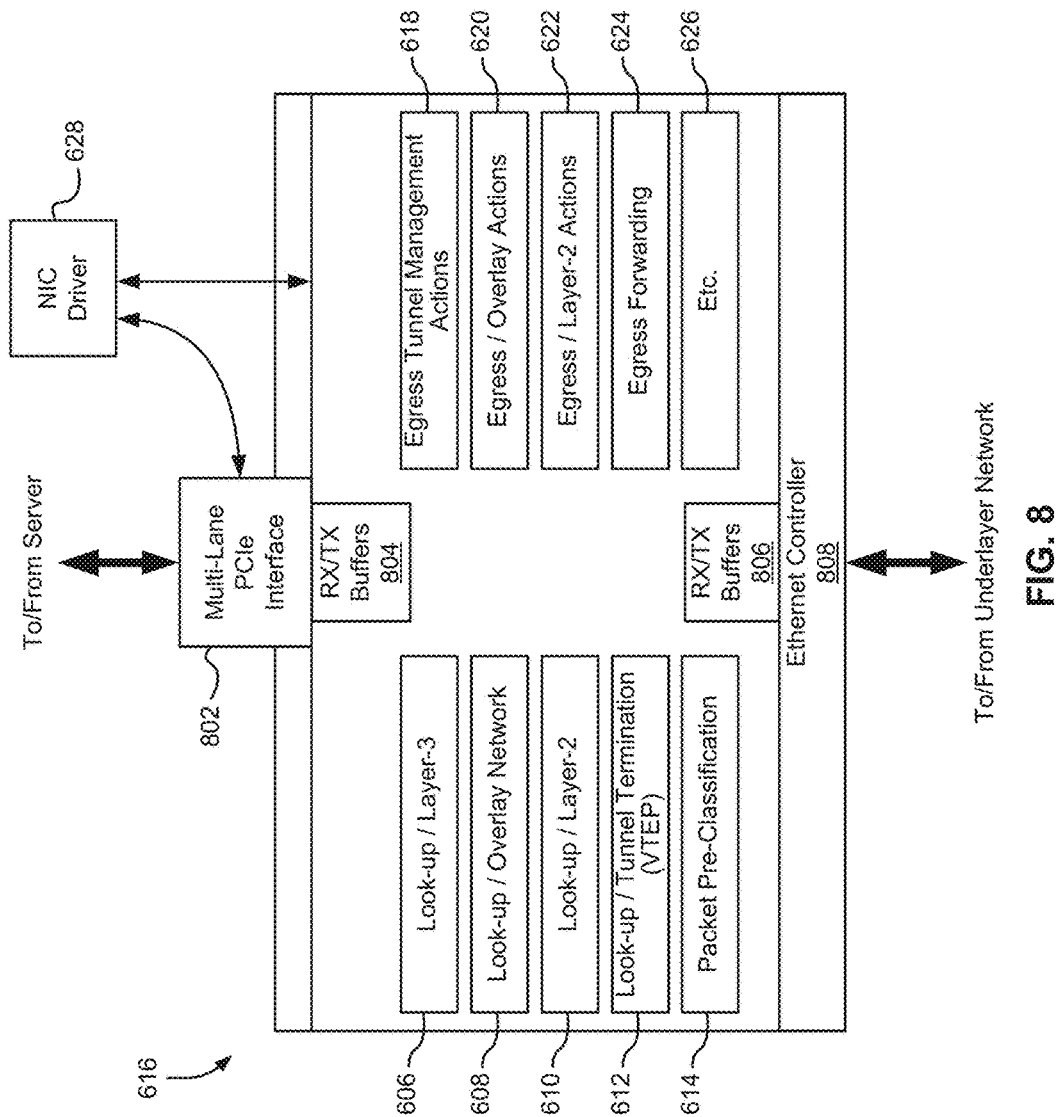
FIG. 8 shows a detailed view of a NIC having overlay gateway functionality, according to one embodiment.

Now referring to FIG. 8, a NIC 616 having overlay network gateway functionality is shown in more detail according to one embodiment. The NIC 616 comprises a multi-lane PCIe interface 802 for interfacing with a server, receiving and transmitting (RX/TX) packet buffers 804 for caching traffic to/from the server, RX/TX packet buffers 806 for caching traffic to/from a network, an Ethernet controller 808 for interacting with the network, and the various overlay network gateway functionality in the form of logic, modules, or some combination thereof. The overlay network gateway functionality may include any of the following, as separate modules or in various combination thereof, such as performing look-ups for L3 addresses and devices 606, performing look-ups for overlay addresses and devices 608, performing look-ups for L2 addresses and devices 610, performing look-ups for tunnel addresses and devices 612, performing packet pre-classification 614, performing egress tunnel management actions (e.g., VTEP) 618, performing egress overlay actions 620, performing egress L2 actions 622, performing egress forwarding actions 624, along with possibly other packet functionality 626, and/or any other overlay network gateway functionality known in the art.

Some additional functionality may include interacting with the virtualization platform and the virtual switch and/or providing I/O virtualization.

According to various embodiments, each module 606, 608, 610, 612, etc., may be implemented by a single processor or a plurality of separate processors, each processor being capable of providing the requisite functionality. The processor(s) may include, but are not limited to, an ASIC, a FPGA, a CPU, a MC, a microprocessor, or some other processor known in the art.

In further embodiments, when each module 606, 608, 610, 612, etc., is implemented in a plurality of separate processors, each processor may be controlled and/or interface with using a separate NIC driver 628 (e.g., one NIC driver for each processor) or by a single NIC driver 628 interfacing with all of the plurality of separate processors, in various embodiments.

According to one embodiment, the virtualization platform may comprise logic adapted for providing overlay functionality to network traffic. In this embodiment, the NIC may comprise functionality to allow the network traffic that has overlay functionality provided by the virtualization platform to bypass the NIC.

In another embodiment, the network may not comprise elements capable of providing overlay network gateway functionality (or overlay functionality). That is to say, the only elements in the network capable of providing overlay network gateway functionality or overlay functionality may be the NICs implemented in the servers. In another approach, the server may not provide overlay functionality at all (e.g., the virtualization platform does not have overlay capability), in which case the NIC is relied upon to provide all overlay functionality. Of course, in other embodiments, there may be some combination of the NIC and other elements which are providing overlay functionality, such as an overlay gateway, a virtualization platform, etc.

In one embodiment, priority of incoming packets may be mapped at ingress based on rules or based on the priority of the inner packet. The outer and inner packet processing may be based on the priority mapping created at ingress. Furthermore, egress 802.1p priority may be maintained as per ingress priority mapping.

Figure 9:
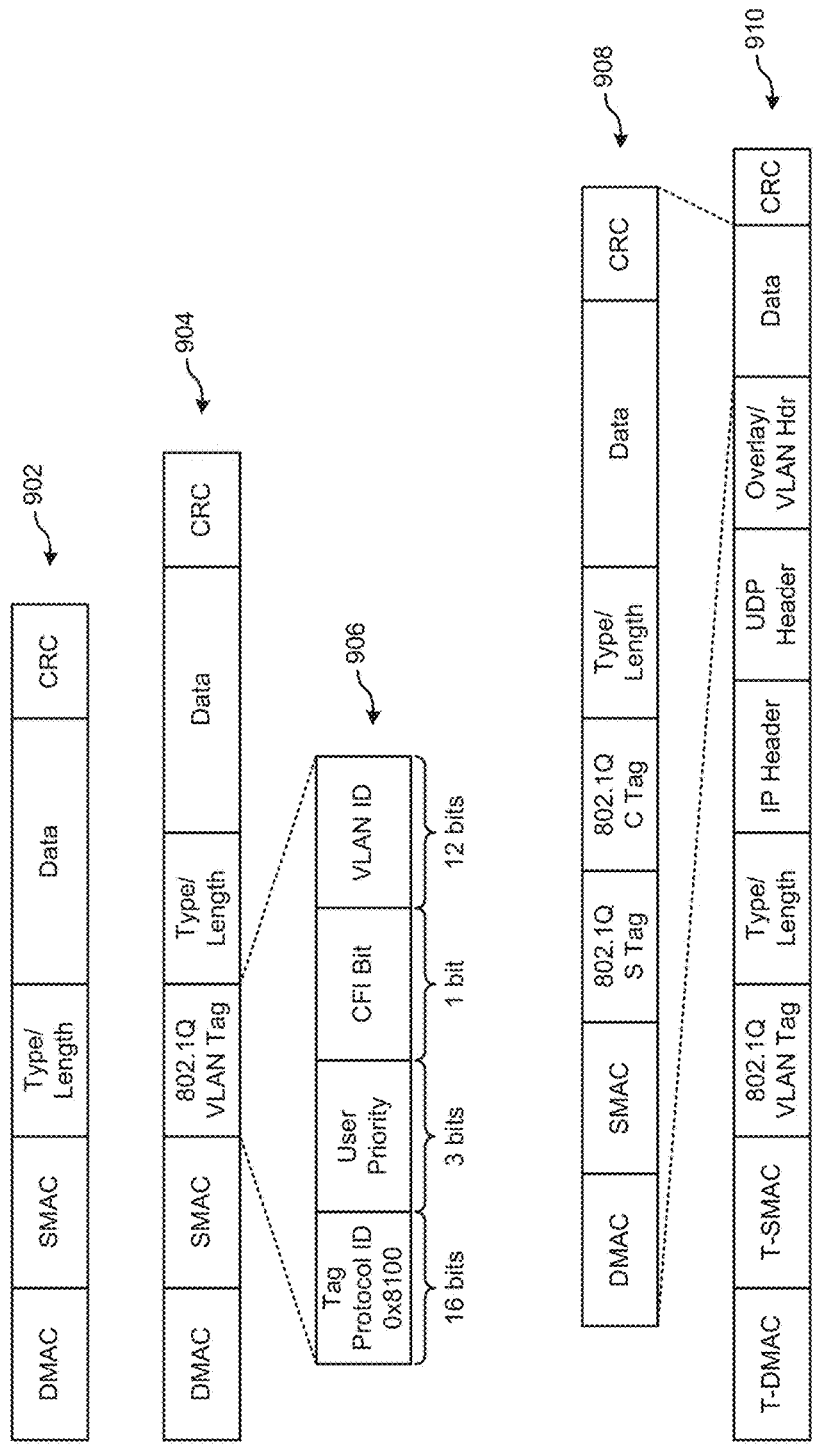
FIG. 9 shows several Ethernet frame formats, for reference in the various embodiments described herein.

With reference to FIG. 9, several Ethernet frame formats are shown according to various approaches. Ethernet frame 902 shows a standard frame without any priority information included. This frame 902 includes a destination media access control (DMAC) address which indicates a destination to forward the packet on to, a source MAC (SMAC) address which indicates a source device or originator for the packet, and a type/length field into which a type length value (TLV) may be placed to indicate the type, length, and miscellaneous information about the packet. The frame 902 also includes a data field for placing data, and a cyclic redundancy check (CRC) field for detecting errors.

In a first step when preparing a packet to be sent out, priority bits are set in a 1Q tag, which results in Ethernet frame 904. As this frame 904 shows, the 802.1Q VLAN tag includes information 906, which includes a tag protocol ID 0x8100 (which may be 16 bits in length), user priority field (which may be 3 bits in length), a canonical format identifier (CFI) bit (1 bit in length), and a VLAN ID (which may be 12 bits in length), according to one embodiment. The IEEE 802.1Q networking standard provides additional information about what each field may be used for, and what information may be stored in each field.

In another embodiment, as shown in frame 908, both a S tag and a C tag may be present in an Ethernet frame 908. This frame 908 may then be encapsulated into a frame 910 to be sent across an overlay network. This tunneling frame 910 may include a tunnel DMAC, a tunnel SMAC, 802.1 Q VLAN tag information that is inherited from the S tag and C tag information of the inner frame 908, an IP header, a UDP header, an overlay or VLAN header, the inner frame 908, and a CRC.

Figure 10:
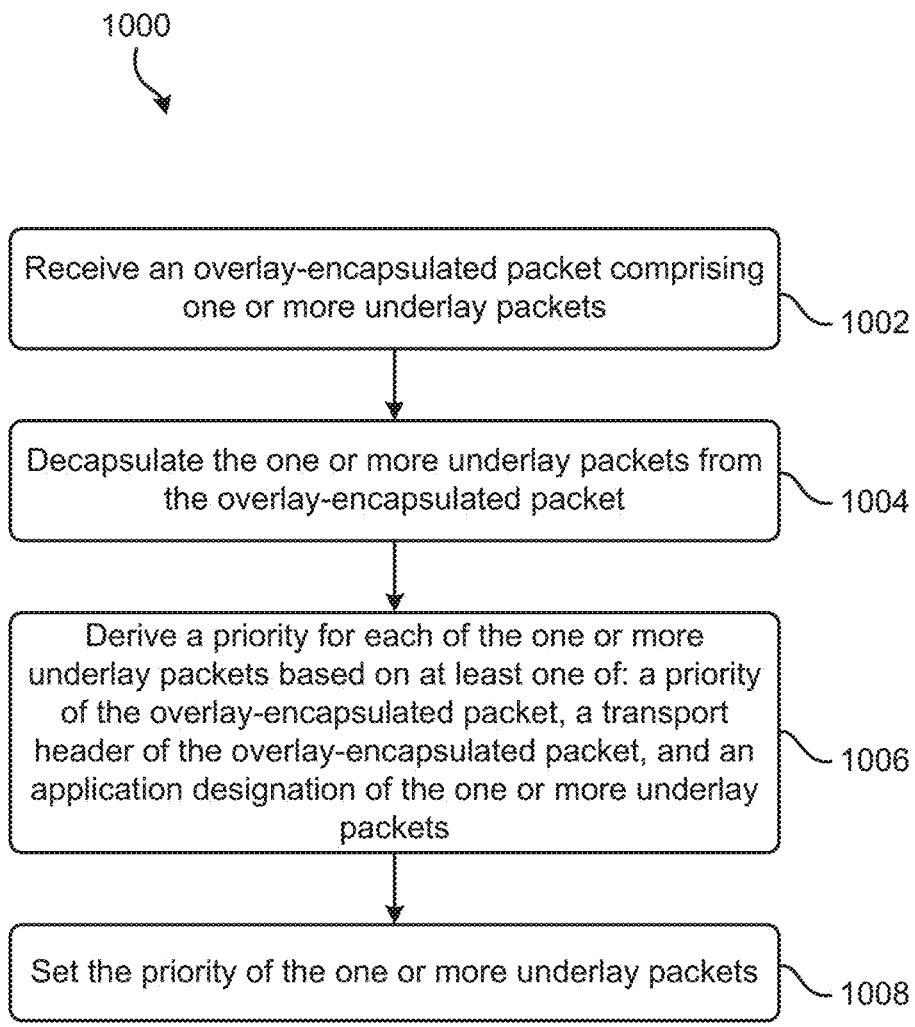
FIG. 10 shows a flowchart of a method, according to one embodiment.

Now referring to FIG. 10, a method 1000 for determining priority of packets is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various non-limiting embodiments, the method 1000 may be partially or entirely performed by a controller, a processor (such as a CPU, an ASIC, a FPGA, etc.) which may be embedded in and/or operate within a server, a NIC, computer program code embedded in a computer readable storage medium within a controller or server, etc.

As shown in FIG. 10, method 1000 may initiate with operation 1002, where an overlay-encapsulated packet comprising one or more underlay packets is received. The overlay-encapsulated packet may be received by any device, module, logic, or construct that is capable of providing tunnel end point operations. The one or more underlay packets may adhere to any frame format, and may be encapsulated across more than one overlay-encapsulated packet, in one approach.

In operation 1004, the one or more underlay packets are decapsulated from the overlay-encapsulated packet, according to any methodology known in the art. Furthermore, some operations may be performed prior to decapsulation, such as reading headers of the overlay-encapsulated packet, determining a destination of the overlay-encapsulated packet, etc.

In operation 1006, a priority for each of the one or more underlay packets is derived based on information included in the overlay-encapsulated packet. Any information may be used, such as a priority of the overlay-encapsulated packet (if the priority has been set prior to receipt thereof), a transport header of the overlay-encapsulated packet (this header may include information that may be used to determine priority of the underlay packet(s)), an application designation of the one or more underlay packets (e.g., what the underlay packets are used for, such as video, audio, alerts, backup, etc.), or any other useful information.

In operation 1008, the priority of the one or more underlay packets is set.

In one embodiment, the priority for each of the one or more underlay packets is set by setting each underlay layer-2 packet's 802.1p bits to designate the derived priority. In a further embodiment, the priority of the overlay-encapsulated packet may be designated via the overlay-encapsulated packet's 802.1p bits, and additionally, the priority for each of the one or more underlay packets may be derived from the overlay-encapsulated packet's 802.1p bits.

According to another embodiment, the priority for each of the one or more underlay packets may be set by setting each underlay layer-3 packet's DSCP value to designate a particular QoS or priority. In a further embodiment, the priority of the overlay-encapsulated packet may be designated via the overlay-encapsulated packet's DSCP value, and additionally, the priority for each of the one or more underlay packets may be derived from the overlay-encapsulated packet's DSCP value.

In a further approach, the method 1000 may also include egress processing the one or more underlay packets differently using a traffic manager. The different levels of egress processing (e.g., dumping the packets, forwarding to a destination normally, forwarding to a destination as high priority, etc.), may be based on the derived priority or a DSCP mapping based on the DSCP value derived from the overlay-encapsulated packet. In a further approach, the priority for each of the one or more underlay packets may be set by setting each underlay layer-2 packet's 802.1q tag to designate the derived priority during egress processing of the one or more underlay packets.

In another approach, the method 1000 may further include ingress processing the one or more underlay packets using the traffic manager based on the derived priority or the DSCP mapping.

Other embodiments described herein may be implemented in the method 1000 as well, as would be understood by one of skill in the art upon reading the present descriptions.

According to another embodiment, the method 1000 may be embodied as a computer program product for determining priority of packets. The computer program product may comprise a computer readable storage medium having computer readable program code embodied therewith, the computer readable program code comprising computer readable program code configured for receiving an overlay-encapsulated packet comprising one or more underlay packets, computer readable program code configured for decapsulating the one or more underlay packets from the overlay-encapsulated packet, computer readable program code configured for deriving a priority for each of the one or more underlay packets based on at least one of: a priority of the overlay-encapsulated packet, a transport header of the overlay-encapsulated packet, and an application designation of the one or more underlay packets, and computer readable program code configured for setting the priority of the one or more underlay packets.

Other embodiments described herein may be implemented in the computer program product as well, as would be understood by one of skill in the art upon reading the present descriptions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
 a processor and logic integrated with and/or executable by the processor, the logic being configured to cause the processor to:
  receive an overlay-encapsulated packet comprising one or more underlay packets;
  decapsulate the one or more underlay packets from the overlay-encapsulated packet;
  derive a priority for each of the one or more underlay packets based on a priority of the overlay-encapsulated packet, a transport header of the overlay-encapsulated packet, or the priority and the transport header of the overlay-encapsulated packet; and
  set the priority of the one or more underlay packets,
  wherein the logic configured to set the priority for each of the one or more underlay packets further causes the processor to set one or more bits designated for storing priority in a header of each underlay packet to designate the derived priority in response to a determination that the one or more underlay packets have been egress processed.

2. The system as recited in claim 1, wherein the logic configured to set the priority for each of the one or more underlay packets further causes the processor to set one or more bits in a header of each underlay layer-2 packet to designate the derived priority.

3. The system as recited in claim 2, wherein the priority of the overlay-encapsulated packet is designated via one or more bits designated for storing priority in a header of the overlay-encapsulated packet, and wherein the priority for each of the one or more underlay packets is derived from the one or more bits designated for storing priority in the header of the overlay-encapsulated packet.

4. The system as recited in claim 1, wherein the logic configured to set the priority for each of the one or more underlay packets further causes the processor to set each underlay layer-3 packet's differentiated services code point (DSCP) value to designate a particular quality of service (QoS).

5. The system as recited in claim 1, wherein the priority of the overlay-encapsulated packet is designated via a differentiated services code point (DSCP) value of the overlay-encapsulated packet, and wherein the priority for each of the one or more underlay packets is derived from the overlay-encapsulated packet's DSCP value.

6. The system as recited in claim 1, wherein the logic is further configured to cause the processor to egress process the one or more underlay packets using a traffic manager based on the derived priority or a DSCP mapping, and wherein the priority for each of the one or more underlay packets is derived from the transport header of the overlay-encapsulated packet.

7. The system as recited in claim 1, wherein the logic is further configured to cause the processor to ingress process the one or more underlay packets using a traffic manager based on the derived priority or a DSCP mapping.

8. A method for determining priority of packets, the method comprising:
 receiving an overlay-encapsulated packet comprising one or more underlay packets;
 decapsulating the one or more underlay packets from the overlay-encapsulated packet;
 deriving a priority for each of the one or more underlay packets based on a priority of the overlay-encapsulated packet, a transport header of the overlay-encapsulated packet, or the priority and the transport header of the overlay-encapsulated packet; and
 setting the priority of the one or more underlay packets comprising setting one or more bits designated for storing priority in a header of each underlay packet to designate the derived priority in response to a determination that the one or more underlay packets have been egress processed.

9. The method as recited in claim 8, wherein the setting the priority for each of the one or more underlay packets comprises setting one or more bits in a header of each underlay layer-2 packet to designate the derived priority.

10. The method as recited in claim 9, wherein the priority of the overlay-encapsulated packet is designated via one or more bits designated for storing priority in a header of the overlay-encapsulated packet, and wherein the priority for each of the one or more underlay packets is derived from the one or more bits designated for storing priority in the header of the overlay-encapsulated packet.

11. The method as recited in claim 8, wherein the setting the priority for each of the one or more underlay packets comprises setting each underlay layer-3 packet's differentiated services code point (DSCP) value to designate a particular quality of service (QoS).

12. The method as recited in claim 11, wherein the priority of the overlay-encapsulated packet is designated via a DSCP value of the overlay-encapsulated packet, and wherein the priority for each of the one or more underlay packets is derived from the overlay-encapsulated packet's DSCP value.

13. The method as recited in claim 8, further comprising egress processing the one or more underlay packets using a traffic manager based on the derived priority or a DSCP mapping.

14. The method as recited in claim 8, further comprising ingress processing the one or more underlay packets using a traffic manager based on the derived priority or a DSCP mapping.

15. A computer program product for determining priority of packets, the computer program product comprising a computer readable storage medium having program instructions embodied therewith, the embodied program instructions being readable by a processor to cause the processor to:
 receive an overlay-encapsulated packet comprising one or more underlay packets;
 decapsulate the one or more underlay packets from the overlay-encapsulated packet;
 derive a priority for each of the one or more underlay packets based on a priority of the overlay-encapsulated packet, a transport header of the overlay-encapsulated packet, or the priority and the transport header of the overlay-encapsulated packet; and
 set the priority of the one or more underlay packets,
 wherein the embodied program instructions readable to cause the processor to set the priority of the one or more underlay packets further causes the processor to set one or more bits designated for storing priority in a header of each underlay packet to designate the derived priority in response to a determination that the one or more underlay packets have been egress processed.

16. The computer program product as recited in claim 15, wherein the embodied program instructions readable to cause the processor to set the priority for each of the one or more underlay packets further causes the processor to set one or more bits in a header of each underlay layer-2 packet to designate the derived priority, wherein the priority of the overlay-encapsulated packet is designated via one or more bits designated for storing priority in a header of the overlay-encapsulated packet, and wherein the priority for each of the one or more underlay packets is derived from the one or more bits designated for storing priority in the header of the overlay-encapsulated packet.

17. The computer program product as recited in claim 15, wherein the embodied program instructions readable to cause the processor to set the priority for each of the one or more underlay packets further causes the processor to set each underlay layer-3 packet's differentiated services code point (DSCP) value to designate a particular quality of service (QoS), wherein the priority of the overlay-encapsulated packet is designated via a DSCP value of the overlay-encapsulated packet, and wherein the priority for each of the one or more underlay packets is derived from the overlay-encapsulated packet's DSCP value.

18. The computer program product as recited in claim 15, wherein the embodied program instructions are further readable to cause the processor to egress process the one or more underlay packets using a traffic manager based on the derived priority or a DSCP mapping.

\* \* \* \* \*